Figure 1:
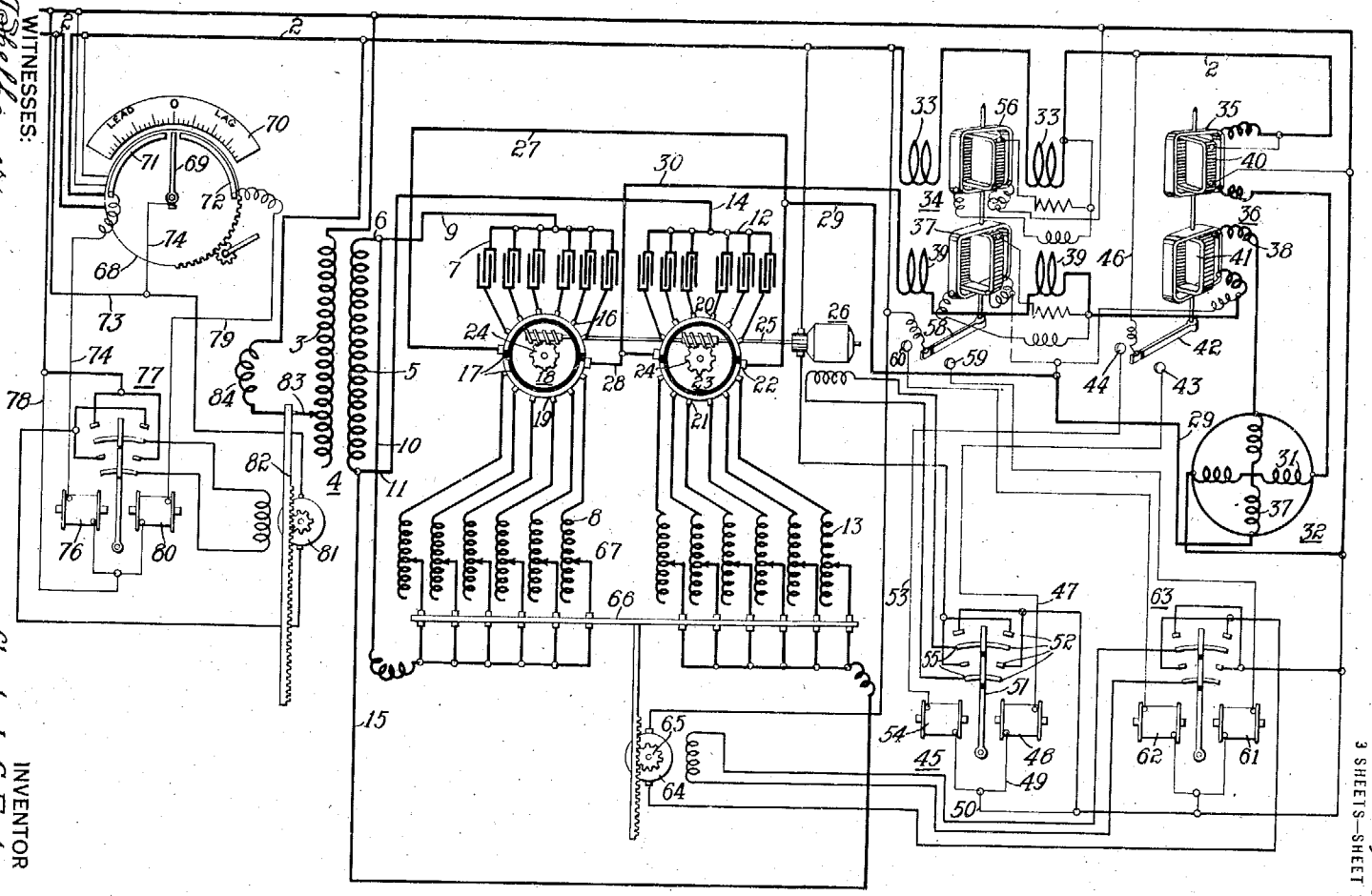

C. LE G. FORTESCUE.

SYSTEM OF DISTRIBUTION.

APPLICATION FILED MAY 13, 1920.

Reissued Nov. 9, 1920.

14,978.

3 SHEETS—SHEET 1.

WITNESSES:

H. T. Shelhamer

O. B. Buchanan

INVENTOR

Charles Le G. Fortescue

BY

Wesley G. Carr

ATTORNEY

C. LE G. FORTESCUE.

SYSTEM OF DISTRIBUTION.

APPLICATION FILED MAY 13, 1920.

Reissued Nov. 9, 1920.

14,978.

3 SHEETS—SHEET 2.

WITNESSES:

H. T. Shelhamer

O. B. Buchanan

INVENTOR

Charles LeG. Fortescue

BY

Wesley G. Carr

ATTORNEY

C. LE G. FORTESCUE.

SYSTEM OF DISTRIBUTION.

APPLICATION FILED MAY 13, 1920.

Reissued Nov. 9, 1920. 14,978.

3 SHEETS—SHEET 3.

WITNESSES:

A. T. Shelhamer

O. B. Buchanan

INVENTOR

Charles LeG. Fortescue

BY

Wesley G. Carr

ATTORNEY

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

SYSTEM OF DISTRIBUTION.

14,978. Specification of Reissued Letters Patent. Reissued Nov. 9, 1920.

Original No. 1,284,294, dated November 12, 1918, Serial No. 155,721, filed March 19, 1917. Application for reissue filed May 13, 1920. Serial No. 381,201.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Systems of Distribution.

My invention relates to alternating-current systems of distribution and it has special relation to phase-modifying means whereby polyphase apparatus, such as motors, generators, rotary converters and the like, may be operated from single-phase power-supply circuits.

More particularly, my invention relates to phase-splitting devices and control means therefor, whereby the electrical conditions obtaining in a single-phase power-supply circuit may be controlled in any desired manner while balanced polyphase conditions, irrespective of the value and character of the polyphase load, may be maintained in polyphase circuits that are furnished with power from the single-phase circuit through the above mentioned phase-splitting devices.

By means of my present invention, balanced polyphase conditions may be automatically maintained in the polyphase circuits, irrespective of the values of the polyphase loads obtaining therein or the power factors at which such loads operate. At the same time, the power factor of the single-phase power-supply circuit may be controlled at will or automatically maintained at any predetermined value, irrespective of the load conditions obtaining in the polyphase circuits. In consequence thereof, polyphase apparatus, such as I have indicated above, may be economically and efficiently operated on a single-phase power-supply circuit with results comparable to those obtained when operating on polyphase circuits of the usual character.

Again, other loads may be connected to the single-phase power-supply circuit and, by reason of the power-factor control of the single-phase circuit obtained by the present system, the single-phase circuit may operate efficiently at all times although furnishing power to both polyphase loads and single-phase loads of diverse character. Therefore, the phase-splitting device of the present invention, besides enabling polyphase apparatus to operate from a single-phase supply circuit, serves as a power-factor control means for the single-phase circuit.

Figure 2:
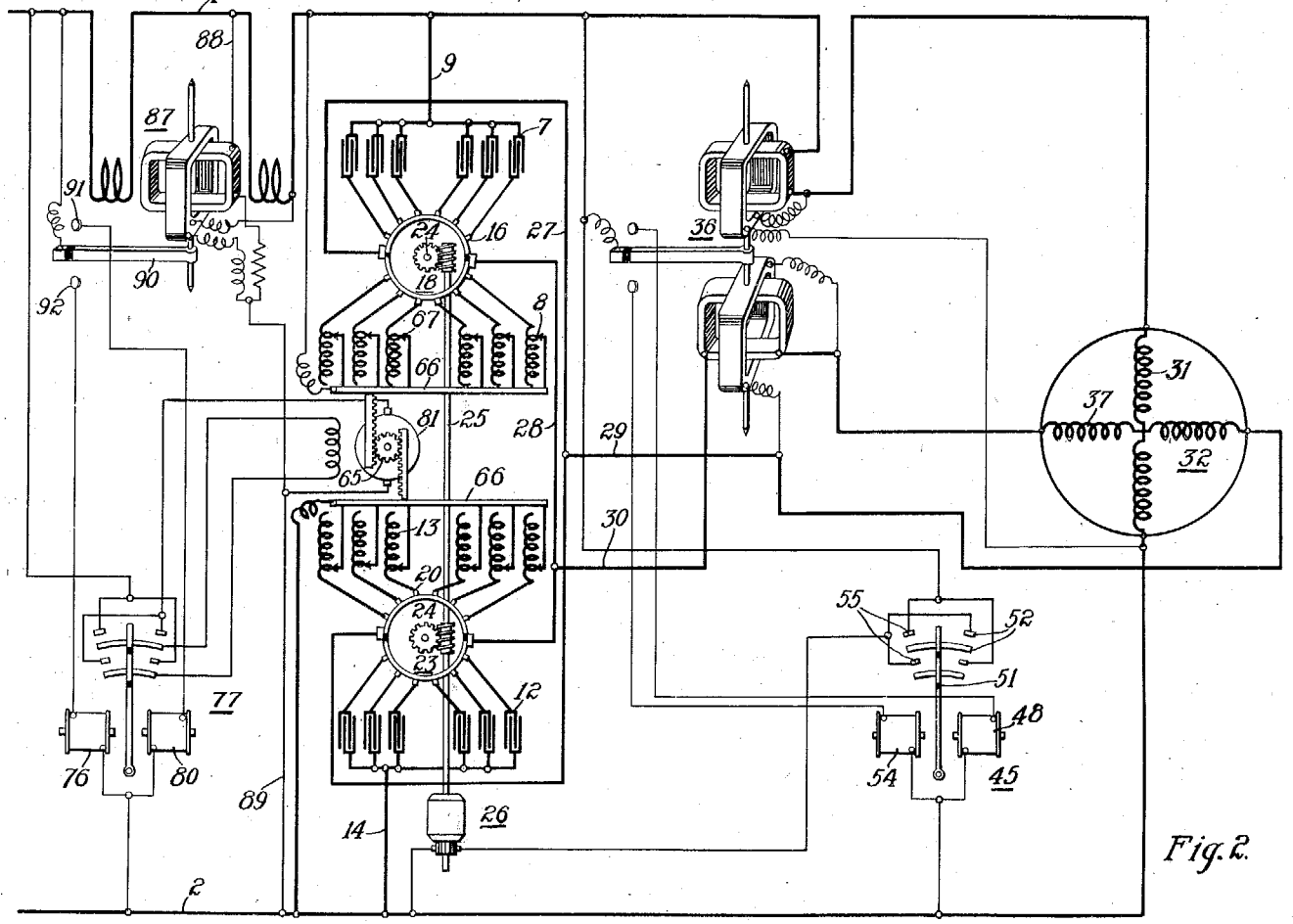
Figure 3:
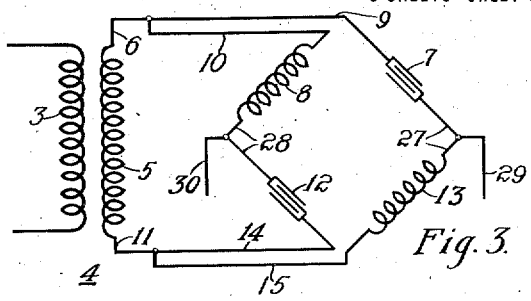
Figure 4:
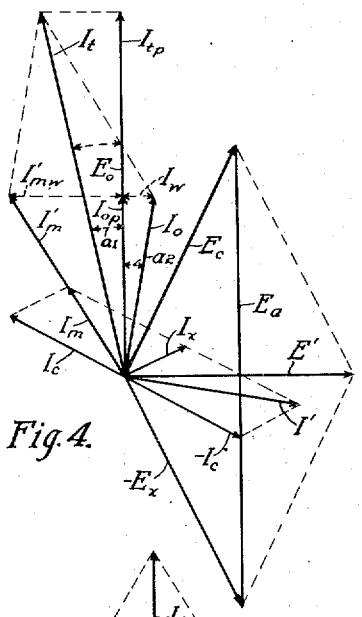
Figure 5:
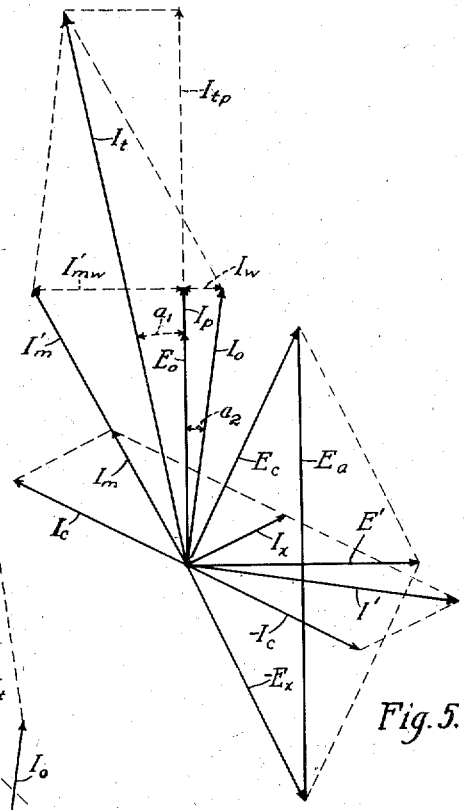
Figure 6:
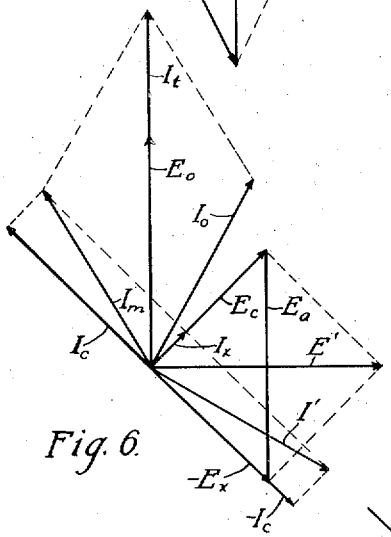
Figure 7:
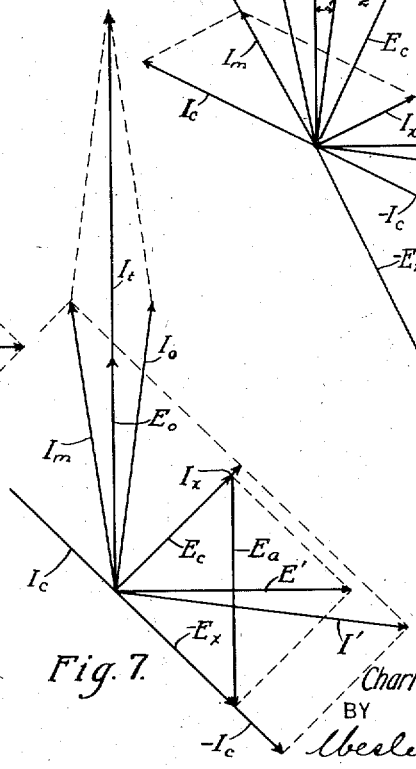

For a better understanding of the characteristic features of my invention, reference may be had to the following description and the accompanying drawings in which Figure 1 is a diagrammatic view of an alternating-current distributing system embodying one form of my invention; Fig. 2 is a diagrammatic view of a modified form of the control system embodied in the system of Fig. 1; Fig. 3 is a diagram showing, in a simplified manner, the circuit arrangements of a portion of the system of Fig. 1; Figs. 4 and 5 are vector diagrams illustrating the electrical conditions that obtain in the single-phase power-supply circuit and the polyphase load circuits, under different conditions, of the system shown in Fig. 1, and Figs. 6 and 7 are vector diagrams illustrating the electrical conditions that obtain in the single-phase power-supply circuit and the polyphase load circuits, under different conditions, of the system shown in Fig. 2.

Referring to the system of Fig. 1, a single-phase power-supply circuit, comprising mains 1 and 2, is connected across an adjustable primary winding 3 of a power transformer 4. A secondary winding 5 of the transformer 4 has one of its terminals 6 connected to a group of parallel-connected condensive elements 7 and a group of parallel-connected adjustable inductive elements 8 through leads 9 and 10, respectively. The other terminal 11 of the secondary winding 5 is connected to a group of parallel-connected condensive elements 12 and a group of parallel-connected adjustable inductive elements 13 through leads 14 and 15, respectively. The condensive elements 7 are severally provided with brushes 16 that are adapted to slidingly engage conducting segments 17 mounted on a control drum 18. The inductive elements 8 are likewise provided with brushes 19 that are adapted to slidingly engage the conducting segments 17 of the control drum 18. In a similar manner, the condensive elements 12 and the inductive elements 13 are severally provided with brushes 20 and 21, respectively, which are adapted to slidingly engage conducting segments 22 mounted on a control drum 23. The control drums 18 and 23 are severally provided with wheel-and-worm mechanisms 24 that operate in unison by reason of the aforesaid worm elements being mounted upon a common shaft 25 that, in turn, is actuated by a motor 26.

Under normal conditions, condensive elements 7 are connected to the inductive elements 13 by means of a conductor 27 that simultaneously engages at least one of the conducting segments 17 of the drum 18 and at least one of the conducting segments 22 of the drum 23. Similarly, the condensive elements 12 are connected to the inductive elements 8 by means of a conductor 28 that simultaneously engages at least one of the conducting segments 17 of the drum 18 and at least one of the conducting segments 22 of the drum 23.

By referring to Fig. 3, it will be observed that the condensive elements 7 of Fig. 1, which are represented in Fig. 3 by the single condenser 7, and the condensive elements 12 of Fig. 1, which are represented in Fig. 3 by the single condenser 12, alternate in position with the inductive elements 8 and the inductive elements 13 of Fig. 1, which are represented, respectively, by single inductive elements 8 and 13 of Fig. 3 to form a closed circuit that I will designate as a "tuned bridge" or a phase-splitting device. Phase-splitting devices of a similar character are disclosed in my copending applications Serial Nos. 83,748, filed Mar. 13, 1916, by Charles Le G. Fortescue and assigned to the Westinghouse Elec. & Mfg. Co., and 153,605, filed Mar. 9, 1917, by Charles Le G. Fortescue and assigned to the Westinghouse Electric & Mfg. Company. The secondary winding 5 of the power transformer 4 impresses the exciting voltage upon the "tuned bridge" and the voltage derived therefrom is impressed upon mains 29 and 30 which are connected respectively to the conductors 27 and 28.

An independent phase winding 31 of a polyphase load device 32 is connected to the single-phase mains 1 and 2 through current coils 33 of a differential power-factor relay 34 and a current coil 35 of a differential wattmeter relay 36. Another phase winding 37 of the polyphase apparatus 32 has one of its terminals connected through a current coil 38 of the differential wattmeter relay 36 and current coils 39 of the differential power-factor relay 34 to the lead 30 which is connected to the derived diagonal of the phase-splitting device. The other terminal of the derived phase winding 37 is connected, by means of the conductor 29, to the other terminal of the derived diagonal of the phase-splitting device.

The differential wattmeter relay 36 comprises a voltage coil 40 which is associated with the current coil 35 and connected directly across the independent phase winding 31 of the polyphase apparatus 32. A second voltage coil 41 is associated with the current coil 38 and connected directly across the derived phase winding 37 of the polyphase apparatus 32. The relay 36 is also provided with a rotatable arm 42 that is adapted to engage either a contact member 43 or a contact member 44, depending upon which wattmeter element of the relay exerts the predominating torque. The differential wattmeter relay 36 is of a well known form of construction and further explanation thereof is not deemed necessary.

The relay 36 is employed to control the excitation of an electromagnetic reversing switch 45 which, in turn, controls the direction of rotation of the motor 26. When a circuit is established from the supply main 2, through a conductor 46, the conducting arm 42 of the relay 36, the contact member 43 and a conductor 47, an electromagnet 48 of the reversing switch 45 is energized since one of its terminals is permanently connected through leads 49 and 50 to the other supply main 1. When the electromagnet 48 is energized, a conducting arm 51 of the switch 45 closes circuits through contact members 52 of said switch 45 to rotate the motor 26 in a given direction. When a circuit is established from the main 2, through the conductor 46, the conducting arm 42 of the relay 36, the contact member 44 and a conductor 53, an electromagnet 54 of the reversing switch 45 is energized and the conducting arm 51 of the switch 45 establishes circuits through conducting members 55, thereby causing the motor 26 to rotate in the other direction.

The motor 26, as mentioned above, rotates the control drums 18 and 23 in the same direction and at the same speed. Each of the drums comprises two conducting segments that are spaced from each other and mounted on the periphery of the drum. When the drums are in their normal positions, as shown, the condensive elements of each group are connected to the same conducting segment on each drum and, likewise, the inductive elements of each group are connected to the same conducting segment. For convenience only, the condensive elements may be considered as severally possessing the same capacity and the inductive elements as severally possessing the same inductance. The latter are also provided with corresponding taps so that, at all times, the reactances afforded by them will be of equal value.

The inductive elements and the condensive elements are capable of being severally connected either in the condensive arms or the inductive arms of the tuned bridge, depending upon the positions occupied by the control drums. When the drums are rotated in a clockwise direction, the conducting segments, normally in contact with all of the condensive elements, are disengaged from some of the condensive elements and brought into contact with some of the inductive elements. The condensive admittance of the bridge is thus decreased, since some of the inductive elements being connected in parallel with some of the condensive elements, serve to increase the reactance offered by the condensive arms of the bridge. At the same time, the conducting segments, normally in contact with all of the inductive elements, are disengaged from some of the inductive elements and brought into contact with some of the condensive elements. The inductive admittance of the bridge is also decreased, since some of the condensive elements, being connected in parallel with some of the inductive elements, serve to increase the reactance offered by the inductive arms of the bridge. It is apparent that, by rotating the drums in a counter-clockwise direction, the condensive admittance of the bridge is decreased and, likewise, the inductive admittance of the bridge is decreased. The motor 26, therefore, regulates the admittance of the several arms comprising the phase-splitting device. When the control drums occupy the positions shown in the system of Fig. 1, the admittances of the condensive and inductive arms of the bridge are at their maximum values.

The differential power-factor relay 34 is of a usual type of construction and comprises an upper group of voltage elements 56 that are connected in circuit with the independent phase winding 31 of the polyphase apparatus, and a lower group of voltage elements 57 that are connected in circuit with the derived phase winding 37 of the polyphase apparatus. When the power factors obtaining in both phase windings 31 and 37 are equal and result from current flow of the same character, a rotatable arm 58, mounted upon the shaft of the power-factor relay 34, occupies a central position with respect to two contact members 59 and 60. The power-factor relay 34, through the circuits established by the rotatable arm 58 and either the contact member 59 or the contact member 60, controls the excitation of electromagnets 61 and 62 of a reversing switch 63 of a usual type of construction.

The reversing switch 63, in turn, controls the direction of rotation of a motor 64 that controls, through a rack-and-pinion mechanism 65, the position of an arm 66 upon which a plurality of adjustable conductors 67 are mounted. The conductors 67 severally engage corresponding taps on the inductive elements 8 and 13 of the phase-splitting device. Since the adjustable conductors 67 are mounted upon the arm 66 and simultaneously engage corresponding taps on the elements 8 and 13, the inductive reactances of the elements 8 and 13 are adjusted in unison, depending upon the direction of rotation of the motor 64. From the foregoing, it will be apparent that the differential power-factor relay 34 also controls the value of the inductive reactance offered by the arms of the phase-splitting device, comprising the groups of elements 8 and 13. In other words, the admittances of the inductive arms of the bridge are also controlled by the relay 34.

As mentioned above, means are provided for controlling the power-factor obtaining in the single-phase circuit under all load conditions. The power-factor of the single-phase circuit may be the result of either a leading current, a lagging current or a current directly in phase with the single-phase voltage, depending upon the position of a rotatable dial 68 that is associated with a power-factor meter (not shown) provided with a conducting indicating arm 69. The conducting arm 69 of the power-factor meter registers upon a scale 70 that is fixed in position and is calibrated to read the power factor of the single-phase circuit. The dial 68 is provided with two spaced conducting segments 71 and 72 with which the conducting arm 69 is adapted to engage, under certain circumstances. When the desired power-factor obtains in the single-phase circuit, the conducting arm 69 occupies a position mid-way between the conducting segments 71 and 72, and, under this circumstance, is out of electrical contact with them. If the dial 68 is rotated in either direction in any convenient manner, the conducting arm 69, in order to occupy a position mid-way between the conducting segments 71 and 72, must likewise rotate.

When the arm 69 engages the conducting segment 71, a circuit is established from the main 2, through a conductor 73, a conductor 74, the arm 69, the conducting segment 71, a lead 75, an electromagnet 76 of a reversing switch 77, a lead 78 and the main 1. Similarly, when the conducting arm 69 engages the conducting segment 72, a circuit is established from the main 2, through the conductor 73, the conductor 74, the arm 69, the conducting segment 72, a conductor 79, an electromagnet 80 of the reversing switch 77, the conductor 78 and the main 1. It is obvious, therefore, that the excitation of the reversing switch 77, which is of a well known type of construction, is dependent upon whether the conducting segment 71 or the conducting segment 72 of the dial 68 is brought into contact with the indicating arm 69 of the power-factor meter.

The reversing switch 77, in turn, controls the direction of rotation of a motor 81 that actuates a rack-and-pinion mechanism 82 upon which an adjustable lead 83 is mounted. The lead 83 is connected, through an extensible conductor 84, to the main 2 and serves to adjust the number of active turns embodied in the primary winding 3 of the power transformer 4.

The power factor of the single-phase circuit is, therefore, controlled by the position of the dial 68 with respect to the indicating scale 70 of the power-factor meter. The dial, of course, may be so regulated as to control the power-factor obtaining in the single-phase supply circuit, irrespective of any load conditions that may be imposed upon the supply circuit. It is obvious, of course, that unity power-factor may be maintained also in the singe-phase circuit, if desired.

From the foregoing description, it will be noted that the power-factor obtaining in the single-phase circuit controls the value of the voltage to be impressed upon the phase-splitting device by the secondary winding 5 of the power transformer 4. The reactances of the inductive elements comprising the two inductive arms of the phase-splitting device are controlled by the power-factors obtaining in the polyphase circuits and the ratio between the reactances offered by the inductive arms and the condensive arms of the bridge is, in this manner, varied. The admittances of all the bridge arms are controlled by the power demands in the polyphase circuits through the medium of the relay 36 and the control drums 18 and 23.

In order to understand the operation of my system, attention is directed to the vector diagrams of Figs. 4 and 5 in order that the electrical conditions simultaneously obtaining in the single-phase and polyphase circuits under different load conditions may be observed.

In Fig. 4, a vector $E_o$ represents the voltage impressed upon the independent phase winding 31 of the polyphase apparatus 32 by the single-phase circuit, and a vector $E'$ represents the voltage impressed upon the derived phase winding 37 by the phase-splitting device. The two-phase currents, lagging behind their respective voltages $E_o$ and $E'$, are represented by vectors $I_o$ and $I'$. In this particular instance, it is desired to maintain a resultant current in the single-phase circuit that leads the impressed voltage by a predetermined phase angle $a_1$. The direction of such a vector representing the resultant single-phase current, therefore, may be determined, since it is to be advanced ahead of the voltage vector $E_o$ by the phase angle $a_1$. Since the two polyphase currents $I_o$ and $I'$ are equal, the value of the power component of each of them may be represented by a vector $I_{op}$ which is in phase with the voltage vector $E_o$. The wattless component of the vector $I_o$ is represented by a vector $I_w$. Since the power component of the single-phase resultant current is twice that of the power component $I_{op}$ of the vector $I_o$, it may be represented by a vector $I_{tp}$. Having determined the power component of the resultant single-phase current to be $I_{tp}$, and knowing the direction of the vector representing the resultant single-phase current, the value and phase position of the resultant single-phase current may be represented by a vector $I_t$.

The resultant single-phase current, of course, is the geometrical sum of the current supplied to the independent phase winding 31 and the current supplied to the primary winding 3 of the power transformer 4 that, in turn, furnishes current to the phase-splitting device. The current supplied to the primary winding 3 may, therefore, be represented by a vector $I'_m$. The power component of the vector $I'_m$ is equal to the power component of the vector $I_o$, and its wattless component is represented by a vector $I'_{mw}$ which may be represented in the vector diagram as being a continuation of the vector $I_w$ that represents the wattless component of the vector $I_o$.

It may be mathematically demonstrated that the ratio of transformation of the tuned bridge or the ratio between the voltage impressed upon the phase-splitting device by the secondary winding 5 of the transformer 4 and the voltage derived therefrom, is equal to the square-root of the ratio between the wattless component of the current supplied to the primary winding 3 of the transformer 4, namely, the current $I'_{mw}$, and the wattless component of the current supplied to the independent phase winding 31, namely, the current $I_w$. Having determined the values of these two wattless component currents, as mentioned above, and knowing the value of the derived voltage obtained from the phase-splitting device, namely, the voltage $E'$, the value of the voltage impressed upon the phase-splitting device may be calculated or arrived at by geometrical construction. This voltage is represented by a vector $E_a$ which, in this instance, is of a relatively larger value than the voltage $E'$. Knowing the values of the voltages impressed across the two diagonals of the phase-splitting device, which voltages are represented by the vectors $E'$ and $E_a$, the voltage impressed upon a condensive arm may be represented by a vector $E_c$ and that impressed upon an inductive arm may be represented by a vector $-E_x$.

Knowing the directions, therefore, of the voltage impressed upon the arms of the bridge, the currents severally obtaining in these arms may be determined, since the currents are displaced ninety degrees in phase from their respective voltages. The vector $I_x$, therefore, represents the current obtaining in one of the inductive arms and the vector $-I_c$ represents the current obtaining in one of the condensive arms. The current vectors $I_x$ and $-I_c$ are, of course, components of the resultant current $I'$ obtaining in the bridge-fed or derived phase winding 37.

The current supplied to the phase-splitting device by the secondary winding 5 of the power transformer 4 is likewise the resultant of the currents supplied to one of the inductive arms and one of the condensive arms and may be represented by a vector $I_m$ which is in phase coincidence with the vector $I'_m$ and has, as its components, the vector $I_x$ and the vector $I_c$ representing, respectively, the currents supplied to an inductive arm and a condensive arm of the bridge.

It will be observed that the currents obtaining in the polyphase circuits, as well as their respective voltages, are in balanced two-phase relationship, the currents lagging in the same degree behind their respective voltages because of the inductive reactance of the polyphase apparatus 32. The resultant current obtaining in the single-phase circuit leads the impressed voltage a predetermined phase angle which it is desired to maintain constant under all load conditions in the polyphase circuits.

The ratio of transformation of the transformer 4 may be determined from the vector diagram, since the current obtaining in the primary winding is represented, in value, by the vector $I'_m$, and the current obtaining in the secondary winding is represented, in value, by the vector $I_m$.

The vector diagram of Fig. 5 illustrates the electrical conditions obtaining when the load upon the polyphase motor 32 is increased in value. Under this circumstance, the currents obtaining in the polyphase circuits are increased and it is assumed that the angles of lag between their respective voltages are decreased by reason of the improved power-factor at which the apparatus 32 operates under increased loads. Corresponding vectors of Fig. 5 are represented by the same reference characters employed in connection with the vectors of Fig. 3. It is not deemed necessary to explain, in detail, the construction of the vector diagram of Fig. 5, but it will be observed that the resultant single-phase current $I_t$ leads the primary voltage $E_o$ by the same phase angle that the resultant single-phase vector $I_t$ of Fig. 4 leads the impressed single-phase voltage.

By comparing the two vector diagrams, it will be noted that the voltage vector $E_a$ of Fig. 5 is increased in value, while the voltage vector $E'$ is maintained at a constant value. As a consequence, the ratio of transformation of the bridge is varied. By comparing the values of the current flow in the condensive arms and the inductive arms of the bridge, in both cases, it will be noted that the admittances of the several bridge arms must be different. The ratio of transformation between the primary and secondary windings of the power transformer 4 is varied also by reason of the increased load conditions in the polyphase circuits.

In order to establish balanced polyphase conditions and maintain the same power factor in the single-phase circuit under these changed load conditions, the voltage impressed upon the phase-splitting device is varied automatically by means of the power-factor-control element 68 inserted in the single-phase circuit. Simultaneously therewith, the value of the inductive elements 8 and 13, embodied in the phase-splitting device and, consequently, the ratio of the admittances of the bridge arms, by means of the differential power-factor relay 34 inserted in the polyphase circuits, are automatically varied. The ratio between the admittances of the inductive and condensive bridge arms, as well as the value of the admittances of the several bridge arms, are also varied automatically by means of the differential wattmeter relay 36 inserted in the polyphase circuits. Complete control of the system is, therefore, effected by the three aforementioned control elements that severally perform their independent adjusting functions to maintain the desired conditions in the circuits.

Although, for convenience, I have shown the inductive elements 8 and 13 as adjustable, the condensive elements 7 and 12 may be made adjustable, while the inductive elements are maintained intact.

In Fig. 2, the control systems are arranged to maintain balanced polyphase conditions and a constant power-factor, preferably of one hundred per cent. in the single-phase circuit, under all load conditions. In other words, the power-factor of the single-phase circuit is not capable of being adjusted but must be maintained at a constant predetermined value.

Assuming that the tuned bridge or phase-splitting device is impressed with a voltage equal to the derived voltage, the power transformer 4 of Fig. 1 is dispensed with and the reactive elements comprising the bridge are directly connected to the supply mains 1 and 2 by means of the conductors 9 and 14. The bridge elements are similar, in all respects, to those of Fig. 1, the inductive elements being adjustable in order to vary the value of the reactance of the inductive elements, as well as the ratio between the admittances of the condensive and inductive arms of the bridge. The control drums 18 and 23 are operated by the motor 26 the direction of rotation of which is controlled by the reversing switch 45. The excitation of the reversing switch 45 is controlled by means of the differential wattmeter relay 36 the elements of which are connected in the polyphase circuits, as explained in connection with the system of Fig. 1. The reversing switch 77, which controls the direction of rotation of the motor 81 is, in this instance, controlled by means of a power-factor relay 87, the current coils of which are connected in circuit with the single-phase main 1 and the voltage coils of which are connected in shunt to the single-phase circuit through leads 88 and 89.

When the predetermined power factor obtains in the single-phase circuit, at which power factor a rotatable arm 90 of the relay 87 occupies its neutral position, the reversing switch 77 is deënergized and, consequently, the motor 81 is inactive. Assume, for instance, that it is desired to maintain the power-factor of the single-phase circuit at 100 per cent. under all load conditions. Whenever the power-factor varies from this value, the rotatable arm 90 will close a circuit through one of the electromagnets of the reversing switch 77, depending upon whether one of the contact members 91 and 92 of the relay is engaged by the arm 90. When the reversing switch 77 is energized, the motor 81 is rotated in the proper direction to vary the value of the inductive elements comprising the phase-splitting device until the desired power-factor is restored in the single-phase circuit.

To understand the operation of the system of Fig. 2, reference may be had to the vector diagrams of Figs. 6 and 7. In Fig. 6, it is assumed that the polyphase motor 32 is operating under a low load and, consequently, at a low power-factor. The currents obtaining in the independent phase winding 31 and the derived phase winding 37 are represented, respectively, by vectors $I_o$ and $I'$. The voltage impressed upon the independent phase winding 31 is represented by a vector $E_o$, and the voltage impressed upon the derived phase winding 37 by a vector $E'$. The voltage impressed upon one of the condensive arms is represented by a vector $E_c$ and that impressed upon one of the inductive arms is represented by a vector $-E_x$. Since the tuned bridge or phase splitter is operating at a one-to-one voltage transformation, the derived voltage is equal to the voltage impressed upon the bridge.

The current flowing in the derived phase winding 37, which current is represented by a vector $I'$, may be resolved into two components, namely, a component $-I_c$ which represents the current flowing through one of the condensive arms and a component $I_x$ which represents the current flowing through one of the inductive arms of the bridge. The current supplied to the bridge is represented by a vector $I_m$ and the resultant single-phase current by a vector $I_t$. It will be observed that the current $I_t$ is in phase with the vector $E_o$, indicating that unity power-factor obtains in the single-phase circuit. It will be observed that the condensive admittance of the bridge is relatively large, as indicated by the current vector $-I_c$, while the inductive admittance is relatively low, as indicated by the current vector $I_x$.

When the load upon the motor 32 is increased, the power-factors of the polyphase circuits are likewise improved. These conditions are represented by the vector diagram of Fig. 7, where the reference characters of Fig. 6 are employed in connection with corresponding vectors. It will be observed that, in this instance, the vector $I_x$, representing the current flowing in one of the inductive arms of the bridge, is greatly increased in value, while the vector $I_c$, representing the current flowing in one of the condensive arms of the bridge, is only slightly increased in value. By comparing the length of the vectors $I_x$ and $-I_c$ of Fig. 7 with the corresponding vectors of Fig. 6, it will be noted that the vector $I_x$ has increased several hundred per cent. in value, while the vector $I_c$ has increased a relatively small per cent. only. This indicates that the inductive admittance of the bridge has increased considerably and at a much higher rate than the condensive admittance, under the increased load conditions in the polyphase circuit.

From the foregoing description, it is obvious that, while a unity power factor exists in the single-phase circuit, complete control is obtained for all load conditions, by varying the ratio between the admittances of the bridge arms as well as varying the reactances of the elements embodied in at least one pair of bridge arms possessing like characteristics.

If the polyphase apparatus 32 operated at a constant power-factor, under all load conditions, it would be unnecessary to vary the ratio of the reactances of the inductive elements of the bridge to the condensive elements. Complete control, in this instance, may be obtained by varying the admittances of the bridge arms but maintaining the ratio between the admittances of the inductive arms and the condensive arms constant, under all load conditions.

A convenient method for maintaining the ratio between the admittances of the condensive and inductive arms of the bridge constant and, at the same time, varying the admittances of the several arms, is to employ condensive elements the reactances of which are severally equal to one another. The reactances of the inductive elements are likewise maintained equal to one another.

As a consequence, the inductive elements and condensive elements may be interchanged between the bridge arms by means of the control drums in order to severally vary the admittances of the bridge arms. At the same time, the ratio between the admittance of the condensive arms and the admittance of the inductive arms of the bridge will be maintained constant.

While I have shown and described several embodiments of my invention, it is to be understood that other modifications may be made therein and, consequently, that the invention is not to be limited to the forms herein specifically described, since it is capable of other embodiments that do not depart from the spirit and scope of the appended claims.

I claim as my invention:

1. The combination with a single-phase power-supply circuit, polyphase load circuits, and phase-modifying means connected with said circuits to enable polyphase apparatus to operate on the single-phase supply circuit, of automatic adjusting means responsive to varying power factor and load conditions in said single-phase supply and said polyphase load for maintaining a power-factor of any predetermined value in the single-phase circuit and balanced polyphase conditions in the polyphase circuits, irrespective of the values and characters of the polyphase loads.

2. The combination with a single-phase power-supply circuit, polyphase load circuits and phase-modifying means connected to said circuits to enable polyphase apparatus to operate on the single-phase supply circuit, of automatic adjusting means responsive to varying power-factor and load conditions in said single-phase supply and said polyphase load for controlling said phase-modifying means and for restoring the desired phase relations in the polyphase circuits and the power-factor in the single-phase circuit to a predetermined value, in case of departure therefrom by reason of varying load conditions obtaining in the polyphase circuits.

3. The combination with a single-phase power-supply circuit, polyphase load circuits, and phase-modifying means connected to said circuits to enable polyphase apparatus to operate on the single-phase supply circuit, of automatic adjusting means controlled by the power demands of the polyphase circuits, the power-factors obtaining therein and the power-factor obtaining in the single-phase circuit for maintaining the desired phase relations in the polyphase circuits and for maintaining a constant power-factor of any predetermined value in the single-phase circuit.

4. The combination with a single-phase power-supply circuit, polyphase load circuits, and phase-modifying means connected with said circuits to enable polyphase apparatus to operate on the single-phase supply circuit, of automatic means controlled by the power demands in the several polyphase circuits, the power-factors obtaining therein and the power-factor obtaining in the single-phase circuit, for maintaining substantially balanced conditions in the polyphase circuits and a power-factor of any predetermined value in the single-phase circuit, irrespective of the load conditions obtaining in the polyphase circuits.

5. The combination with a single-phase power-supply circuit, and polyphase load circuits, of a bridge comprising condensive and inductive reactance elements alternating in position with one another in a closed circuit for interconnecting said single-phase and said polyphase circuits, and automatic adjusting means for maintaining a power-factor of any predetermined value in the single-phase circuit and substantially balanced polyphase relations in said polyphase load circuits irrespective of the varying power-factors and varying loads which may exist in said polyphase load circuits.

6. The combination with a single-phase circuit, a polyphase circuit, and a phase-spliting device comprising a plurality of condensive and inductive reactance elements alternating in position with one another in a closed circuit for interconnecting said single-phase and poly-phase circuits, one of the phases of said polyphase circuits constituting said single-phase circuit and another phase being derived from said phase-splitting device, of means for simultaneously varying the voltage impressed upon the phase-splitting device and the ratio between the admittances of said elements comprising the phase-splitting device, in accordance with the power-factor obtaining in the single-phase circuit and the load conditions obtaining in the polyphase circuits.

7. The combination with a single-phase power-supply circuit, polyphase load circuits, and a phase-splitting bridge comprising a plurality of arms having condensive and inductive characteristics and being connected in a closed circuit for permitting the interchange of energy between the single-phase circuit and said polyphase circuits, of adjusting means responsive to varying power-factor and load conditions in said single-phase supply and said polyphase load for severally varying the admittances of said bridge arms and the ratios between the condensive and inductive admittances of said phase-splitting bridge.

8. The combination with a single-phase power-supply circuit, polyphase load circuits, and a phase-splitting bridge comprising a plurality of arms having condensive and inductive characteristics and being connected in a closed circuit for delivering energy from the single-phase circuit to said polyphase circuits, of means for varying the admittances of said bridge arms in accordance with the difference of load demands in the polyphase load circuits.

9. The combination with a single-phase power-supply circuit, polyphase load circuits, and a phase-splitting bridge comprising a plurality of arms having condensive and inductive characteristics and being connected in a closed circuit for delivering energy from the single-phase circuit to said polyphase circuits, of means for varying the admittances of the said bridge arms in accordance with the difference of load demands of the polyphase circuits, and additional means for varying the ratio between the condensive and inductive admittances of said phase-splitting bridge.

10. A phase-splitting bridge comprising a plurality of arms having condensive characteristics and a plurality of arms alternating in position with said first arms and having inductive characteristics, and means controlled by the conditions obtaining in the said polyphase circuits for varying the admittances of at least one group of bridge arms possessing like characteristics and for varying, in a similar manner, the admittances of all of the bridge arms.

11. A phase-splitting bridge comprising two arms having a plurality of condensive elements and two arms alternating in position with said first arms and having a plurality of inductive elements, the elements of at least one group of arms having the same characteristics being adjustable, and means for simultaneously varying, in the same degree, the admittances of all the arms possessing like characteristics.

12. A phase-splitting device comprising arms severally embodying a plurality of reactive elements, one of said arms possessing condensive characteristics and another of said arms possessing inductive characteristics, a control drum associated with said arms, conducting segments on said drum for normally connecting all of the elements constituting each arm in parallel relationship, and means responsive to the power-factor and load demands of the currents supplied by said phase-splitting device for rotating said drum, whereby some of the elements normally positioned in one of the arms may be interchanged with some of the elements normally positioned in the other of said arms.

13. A phase-splitting bridge comprising two arms severally embodying a plurality of condensive elements and two arms alternating in position with said first arms and severally embodying a plurality of inductive elements, control drums that are severally associated jointly with one condensive arm and one inductive arm, conducting segments on said drums for normally connecting the elements embodied in the condensive arms in parallel relationship and the elements normally embodied in the inductive arms in parallel relationship, and means responsive to the power-factor and load demands of the currents supplied by said phase-splitting device for rotating said drums whereby some of the inductive elements may be interchanged with some of the condensive elements.

14. A phase-splitting bridge comprising two arms having a plurality of condensive elements and two arms alternating in position with said first arms and having a plurality of inductive elements, of adjusting means responsive to the power-factor and load demands of the currents supplied by said phase-splitting device for correspondingly varying the admittances of at least one group of arms possessing a like characteristic and for varying the ratio between the admittances of the arms possessing unlike characteristics.

15. In a system of transmission, the combination with polyphase circuits, of a phase-splitting bridge therefor comprising a network of condensive and inductive elements that is interconnected with a plurality of said polyphase circuits, said elements being so arranged that the several polyphase electromotive forces are offered equal and electrically symmetrical admittances.

16. A phase-splitting bridge comprising a plurality of interconnected reactive elements possessing diverse electrical characteristics, and independent means for simultaneously varying the admittances of two-oppositely-positioned elements of said bridge.

17. A phase-splitting bridge comprising a plurality of interconnected reactive elements possessing diverse electrical characteristics, and independent means for proportionately varying the admittances of said elements thereby maintaining the ratio between the admittances constant.

18. A phase-splitting bridge comprising a plurality of interconnected reactive elements possessing diverse electrical characteristics, means for proportionately varying the admittances of said elements, and means for varying the ratio between the admittances.

19. A phase-splitting bridge comprising a plurality of symmetrically arranged adjustable reactive elements possessing diverse electrical characteristics, means for proportionately varying the admittances of said elements, and independent means for varying the admittance of at least one group of elements that possess the same electrical characteristics.

20. A phase-splitting bridge comprising a plurality of elements severally having condensive and inductive characteristics and being connected alternatively in a closed circuit, and independent means for simultaneously varying the admittances of two oppositely-positioned elements of said bridge.

21. A phase-splitting bridge comprising a plurality of elements severally having condensive and inductive characteristics and being connected alternately in a closed circuit, and independent means for proportionately varying the admittances of said elements thereby keeping the ratio between the admittances constant.

22. A phase-splitting bridge comprising a plurality of elements severally having condensive and inductive characteristics and being connected alternately in a closed circuit, means for proportionately varying the admittances of said elements, and means for varying the ratio between the admittances.

23. A phase splitting bridge comprising a plurality of elements having condensive and inductive characteristics and being connected alternately in a closed circuit, means for proportionately varying the admittances of said elements, and means for independently varying the admittances of at least one group of said elements that possess the same electrical characteristics.

In testimony whereof, I have hereunto subscribed my name this 10th day of May, 1920.

CHARLES LE G. FORTESCUE.